United States Patent
Armbruster

(10) Patent No.: US 8,764,434 B2
(45) Date of Patent: Jul. 1, 2014

(54) MOUNTING DEVICE FOR A ROTATABLE CENTER PART IN AN INJECTION MOLDING DEVICE

(75) Inventor: Rainer Armbruster, Wolfach (DE)

(73) Assignee: Foboha GmbH Formenbau, Haslach (DE)

( * ) Notice: Subject to any disclaimer, the term of this patent is extended or adjusted under 35 U.S.C. 154(b) by 102 days.

(21) Appl. No.: 13/582,622

(22) PCT Filed: Feb. 24, 2011

(86) PCT No.: PCT/EP2011/052754
§ 371 (c)(1),
(2), (4) Date: Sep. 4, 2012

(87) PCT Pub. No.: WO2011/107395
PCT Pub. Date: Sep. 9, 2011

(65) Prior Publication Data
US 2012/0328730 A1    Dec. 27, 2012

(30) Foreign Application Priority Data
Mar. 2, 2010 (CH) .......................... 270/10

(51) Int. Cl.
*B29C 45/33* (2006.01)
(52) U.S. Cl.
USPC .......................... 425/574; 425/576

(58) Field of Classification Search
CPC .............. B29C 45/1628; B29C 45/045; B29C 45/5008
USPC ................................................... 425/574, 576
See application file for complete search history.

(56) References Cited

U.S. PATENT DOCUMENTS

| | | |
|---|---|---|
| 3,224,043 A | 12/1965 | Lameris et al. |
| 3,319,300 A | 5/1967 | Hehl |
| 4,243,364 A | 1/1981 | Rees et al. |
| 4,734,023 A | 3/1988 | Nesch et al. |
| 4,744,741 A | 5/1988 | Glover et al. |

(Continued)

FOREIGN PATENT DOCUMENTS

| | | |
|---|---|---|
| DE | 10 2007 029 119 A1 | 1/2008 |
| EP | 0 895 848 A1 | 2/1999 |

(Continued)

*Primary Examiner* — Tim Heitbrink
(74) *Attorney, Agent, or Firm* — Pauley Petersen & Erickson

(57) ABSTRACT

The invention relates to a mounting device (1) for a center part (4) rotatable about a rotary axis (6) in an injection molding device. The mounting device comprises at least one lower mounting device (2) having a modularly constructed lower cross member (7). The cross member (7) comprises a center block (9) and at least one side block (11) fastened to the center block (9). The center block (9) comprises operative connection means for fastening a lower rotary unit (24) for rotatably mounting the center part (4) about rotary axis (6).

18 Claims, 6 Drawing Sheets

(56) References Cited

U.S. PATENT DOCUMENTS

| | | | |
|---|---|---|---|
| 4,836,767 A * | 6/1989 | Schad et al. ............... 425/576 |
| 6,139,305 A | 10/2000 | Nesch |
| 6,558,149 B1 * | 5/2003 | Bodmer et al. ............. 425/576 |
| 6,709,251 B2 | 3/2004 | Payette et al. |
| 6,739,857 B2 * | 5/2004 | Lichtinger ................. 425/576 |
| 6,783,346 B2 * | 8/2004 | Bodmer et al. ............. 425/576 |
| 7,018,189 B2 | 3/2006 | Wobbe et al. |
| 7,314,362 B2 * | 1/2008 | Lichtinger ................. 425/576 |
| 7,455,516 B2 | 11/2008 | Glashagen et al. |
| 2003/0094732 A1 | 5/2003 | Payette et al. |
| 2006/0244178 A1 | 11/2006 | Armbruster |
| 2006/0273489 A1 | 12/2006 | Shakal |
| 2009/0256282 A1 | 10/2009 | Olaru et al. |

FOREIGN PATENT DOCUMENTS

| | | |
|---|---|---|
| EP | 1 035 959 A1 | 9/2000 |
| EP | 1 155 802 A2 | 11/2001 |
| EP | 1 725 386 | 11/2006 |
| JP | 2-143819 A | 6/1990 |
| WO | WO 99/28108 | 6/1999 |
| WO | WO 2005077637 | 8/2005 |
| WO | WO 2007/082394 A1 | 7/2007 |

* cited by examiner

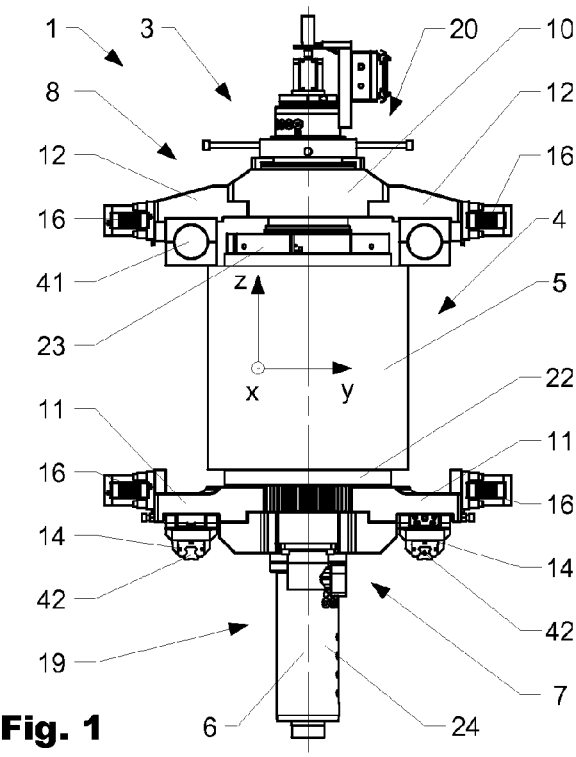

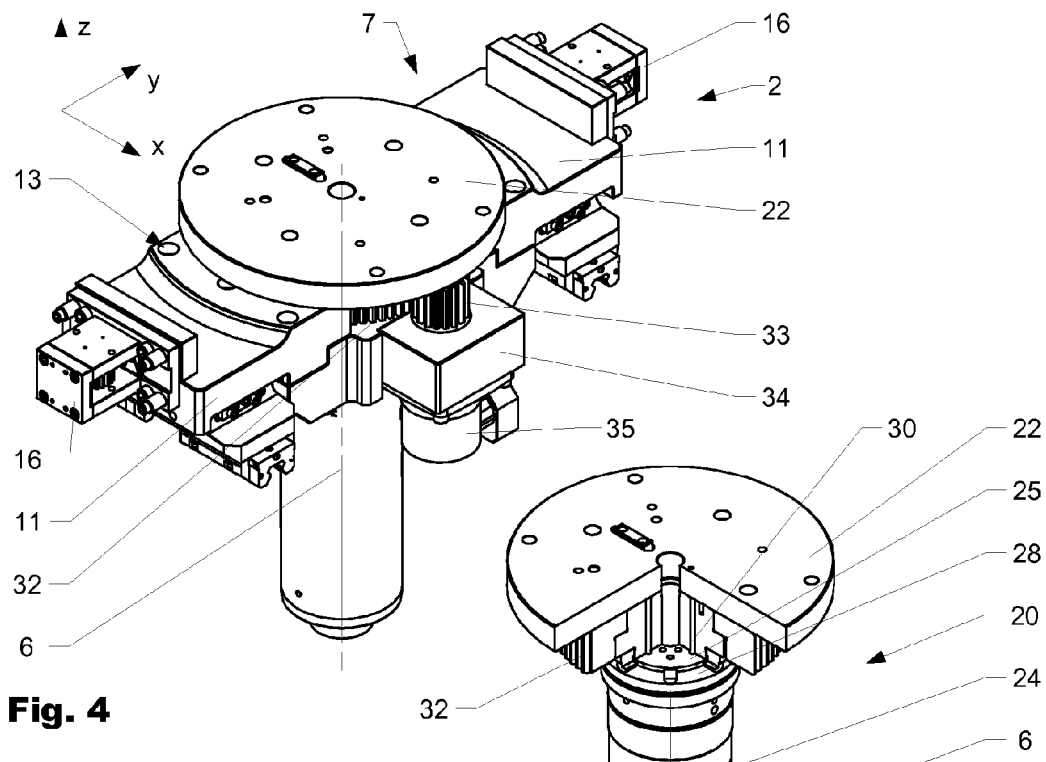
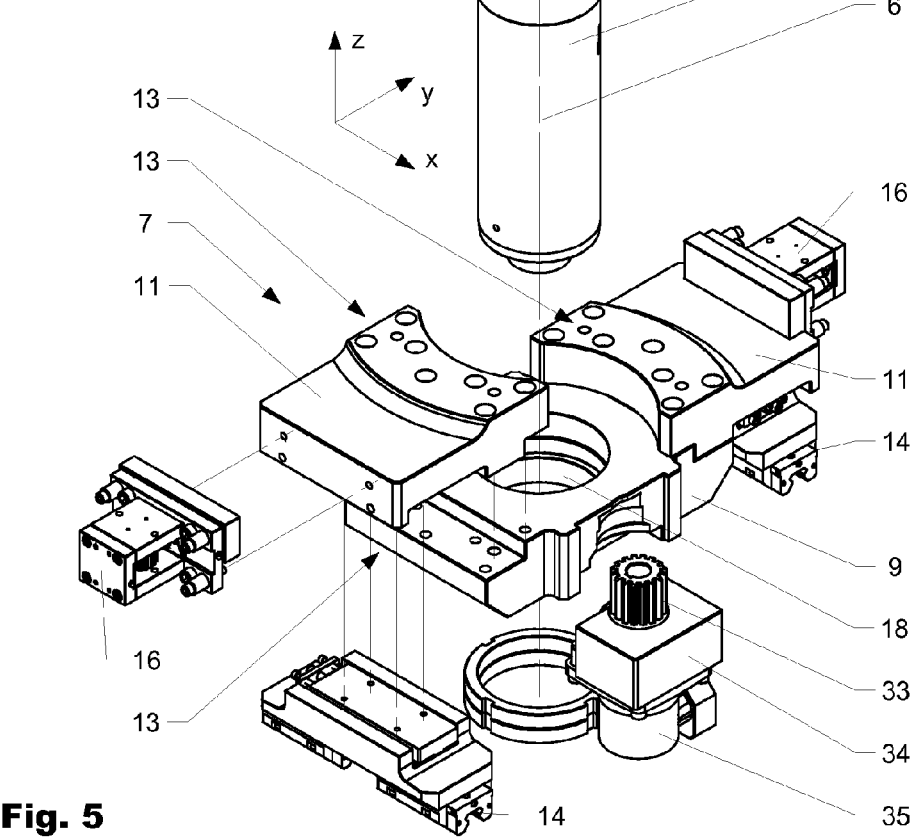

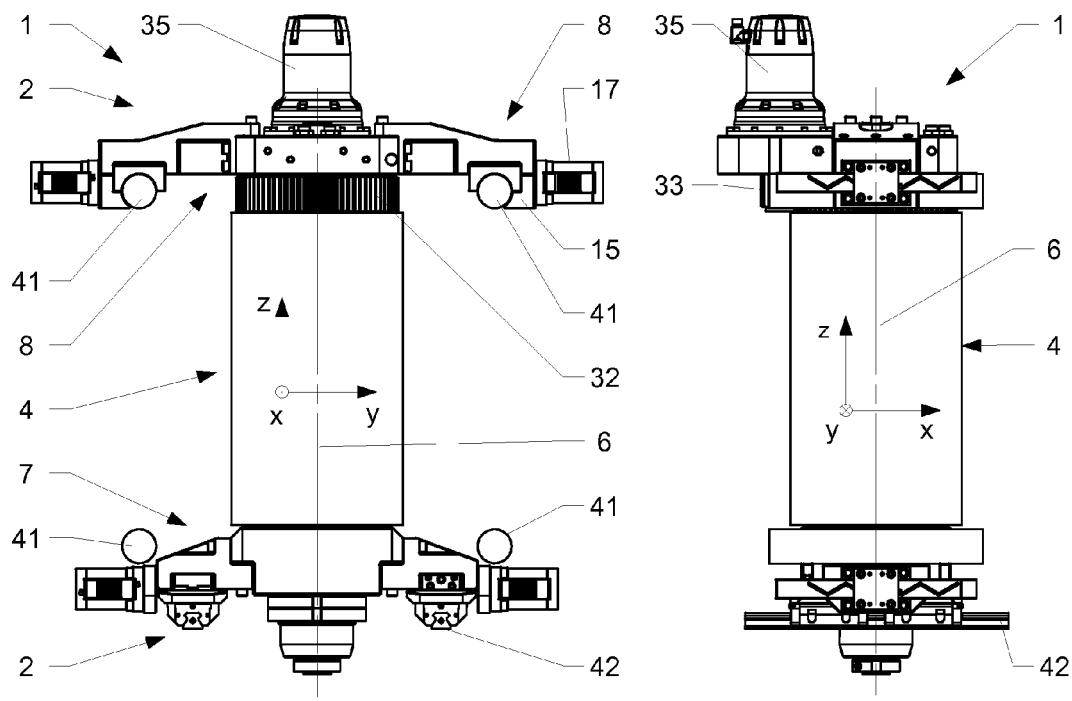
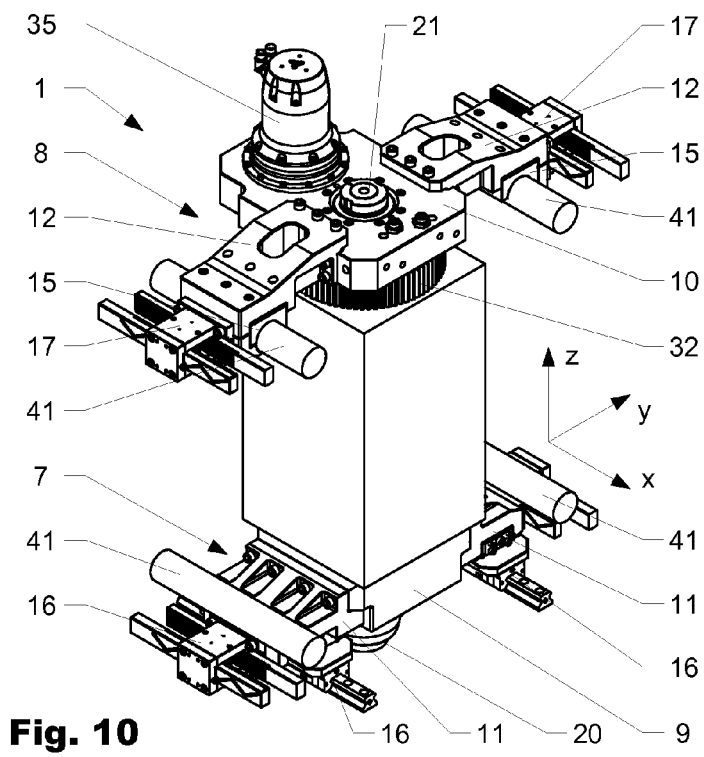

MOUNTING DEVICE FOR A ROTATABLE CENTER PART IN AN INJECTION MOLDING DEVICE

BACKGROUND OF THE INVENTION

1. Field of the Invention

The present invention lies in the field of devices for injection molding of plastic according to the preamble of the independent patent claim.

2. Discussion of Related Art

Injection molding devices for injection molding with one or more rotating center parts are known from the prior art. These are used for the efficient fabrication of multicomponent plastic parts. Between two mold halves that can travel in a first direction toward each other along tie bars, at least one rotatable center part is arranged, which is fastened to a mounting device and can turn about an axis of rotation. The rotatable center part has at least two parallel side surfaces, along which it interacts with the two mold halves to form cavities. In certain configurations, the rotatable center part can cooperate at least on one side with another rotatable center part. Coordination means ensure that the rotatable center part remains positioned in the middle between the two mold halves during the opening and closing process, thus avoiding collisions.

EP1035959 and EP1155802 of the same applicant were published in 1999 and both of them concern a mounting device for a rotatable center part (mold, mold half, mold carrier). The mounting device has a lower and an upper cross member, which are led along the tie bars of an injection molding machine. Each cross member of the mounting device has a rotatable mounting means, which serves for the detachable clamping of the mold, mold half, or mold carrier between them. The transfer of media preferably occurs coaxially across interfaces.

EP1725386 of the same applicant was published in 2005 and concerns a method and an injection molding device with more than one rotatable center part. Thus, the possibility exists of making parts in two external parting planes and mounting these in a further processing step in another parting plane. The figures show different configurations of mounting devices for the rotatable center parts.

Further documents are known from the prior art concerning methods or devices to carry out the methods and having at least one rotatable center part.

Some examples are listed by means of the publication numbers of a member of the family: U.S. Pat. No. 3,224,043 (Lego Systems SA, 1963), U.S. Pat. No. 3,319,300 (Aarburg Maschinenfabrik, 1964), U.S. Pat. No. 4,243,364 (Husky Injection Molding, 1981), U.S. Pat. No. 4,744,741 (The Nepworth Iron Company Ltd.), U.S. Pat. No. 4,734,023 (Klöckner Ferromatik Desma GmbH, 1987), JP2143819 (Stanley Electric Co. Ltd.), U.S. Pat. No. 6,139,305 (Ferromatik Milacron Maschinenbau GmbH), U.S. Pat. No. 7,018,189 (Krauss Maffei Kunststofftechnik GmbH), U.S. Pat. No. 6,709,251 (MGS Enterprises Inc.), U.S. Pat. No. 7,455,516 (Krauss Maffei Kunststofftechnik GmbH).

SUMMARY OF THE INVENTION

One problem of the invention is to indicate an improved mounting device for rotatable mold center parts having more flexible applications and enabling a simplified, cheaper manufacturing.

This purpose is solved by the mounting device as defined in the independent patent claims.

The invention comprises a modularly constructed mounting device for the mounting of a rotatable center part in an injection molding device, or an injection molding machine. Thanks to the special modular construction, the possibility exists of adapting the mounting device flexibly to different kinds and dimensions of injection molding machines. In one embodiment, the mounting device has at least one cross member with a multipart construction. The cross member comprises a center block, to which one can fasten, using standardized interfaces, different rotary units as needed, as well as one or more identical or different side blocks. The side blocks serve for the direct or indirect bracing of the mounting device via guiding means on tie bars or a foundation of an injection molding machine. The side blocks can have specific configurations adapted to the type and dimension of injection molding machines (e.g., spacing of the tie bars). The side blocks are suitable for direct or indirect fastening of guide means, e.g., in the form of single or multiple-part bearing shells or guide rails. The side blocks can be configured so that they are suitable at the same time for the fastening of coordination means. The modular configuration of the mounting device of the invention enables an individual construction of the mounting device, optimized for different injection molding machines. One advantage is that an existing mounting device can easily be transferred to another injection molding machine, e.g., by changing only the side blocks and the bearing shells.

A mounting device according to the invention serves for the mounting of a center part that can turn about an axis of rotation in an injection molding device with an injection molding machine and outer mold halves. The injection molding device generally comprises a stationary first mold half and a second mold half able to move in a first direction relative to the stationary half, which are fastened to a first and a second mold clamping plate of the injection molding machine. The rotatable center part is arranged between the first and the second mold half and has one or more pairs of side surfaces arranged basically parallel to each other, in which first cavity halves are arranged. The first cavity halves serve to form, in the region of a first and a second parting plane, mold cavities with second or third cavity halves of the first and second mold halves. By relative displacement of the first and the second mold half, or the rotatable center part arranged between them, toward each other in the first direction, the injection molding device can be opened or closed along the first and the second parting plane. Depending on the configuration, several rotatable center parts can also be arranged one behind the other or alongside each other between the two mold halves.

Contrary to the prior art, the mounting device has at least one modularly constructed cross member. The cross member generally has a center block, to which at least one side block is fastened, which serves to support, or guide and/or coordinate the mounting device with respect to the injection molding device. For this purpose, guide means or coordination means can be fastened on the side block. The center block has operative connection means for the fastening of a rotary unit for the rotatable mounting of the center part about the axis of rotation. The mounting device can have a lower and/or an upper mounting device. Thanks to the modular cross member, a mounting device can be constructed from standardized parts (center blocks, rotary units, side blocks, etc.) to suit the requirements and be adapted to different injection molding machines.

As a rule, side blocks are arranged on two opposite sides of the center block and at least one guide means is arranged on each of them. The guide means serve for the linear guiding of the cross member and, thus, the mounting device in the first direction. The guide means are arranged so as to move in a linear manner on the tie bars and/or relative to a foundation of an injection molding machine. For this purpose, guide rails can be braced on the machine foundation.

When opening and closing the injection molding device it is necessary for the rotatable center part to be arranged in the middle between the first and the second mold half To ensure this, coordination means are used, e.g., in the form of interconnected racks or threaded spindles or hydraulic cylinders and the like. At least one of the side blocks generally has operative connection means for the fastening of a coordination means, by which the associated cross member and, thus, the center part is coordinated with respect to the injection molding device.

The at least one rotary unit is also advantageously constructed as a module that is detachably operatively connected to the center block. The rotary unit has an inner part rotatably mounted relative to an outer part by means of a lower and an upper bearing. In the region of two concentrically opposite side surfaces of the outer and the inner part there are arranged concentrically running annular grooves between the outer part and the inner part. These lead to axially extending channels of the inner part and serve to transfer media to the rotatable center part in one or more circuits. By media is meant water, air or hydraulic fluid and the like, which are required to operate the injection molding device. Depending on the configuration, the annular grooves can be staggered from each other in the axial and/or radial direction. So that the media cannot leak out, seals can be arranged between the annular grooves. If need be, an adapter plate can be secured at least to one of the inner parts, by means of which the rotatable center part can be operatively connected to the corresponding inner part. For example, in rather small configurations or configurations that do not need to be taken apart, the inner part can be operatively connected permanently to the rotatable center part. The adapter plate can be outfitted with automatically locking and unlocking quick couplings for transfer of media between the adapter plate and the rotating center part. In order to drive the rotatable center part, the mounting device has an electric or hydraulic motor, which is operatively connected via a transmission to the rotating center part. To better distribute the forces, the transmission can be a planetary transmission, with an outer annular internally toothed first gear and an inner externally toothed second gear, between which several planet wheels are arranged for the distributed transmission of forces to the rotatable center part. In order to easily assemble and disassemble the rotatable center part, the lower and/or the upper mounting device can have a adjusting device, by which the rotary unit can be positioned in the axial direction (the direction of the axis of rotation) relative to the center block. In one embodiment, the center block has an opening arranged in the axial direction, which serves to receive a rotary unit. The opening can be open in the lateral direction if need be, so that the rotary unit can be installed from the side.

BRIEF DESCRIPTION OF THE DRAWINGS

Sample embodiments of the invention shall be described by means of the following figures. There are shown:

FIG. 1, a first embodiment of a mounting device of the invention with a rotatable center part from the front, FIG. 2, the mounting device and the center part of FIG. 1 from the side, FIG. 3, the mounting device and the center part of FIG. 1 in a perspective representation, FIG. 4, a lower mounting device in a perspective representation, FIG. 5, the lower mounting device of FIG. 4 in an exploded view, FIG. 6, an upper mounting device in a perspective representation, FIG. 7, the upper mounting device of FIG. 6 in a perspective representation from above at a slant, FIG. 8, a second embodiment of a mounting device of the invention with a rotatable center part from the front, FIG. 9, the mounting device and the center part of FIG. 8 from the side, FIG. 10, the mounting device and the center part of FIG. 8 in a perspective representation from above at a slant, FIG. 11, the mounting device of FIG. 10 in an exploded view from above at a slant, FIG. 12, a third embodiment of the invention in a perspective representation from above at a slant.

DETAILED DESCRIPTION OF THE INVENTION

Figure 6:
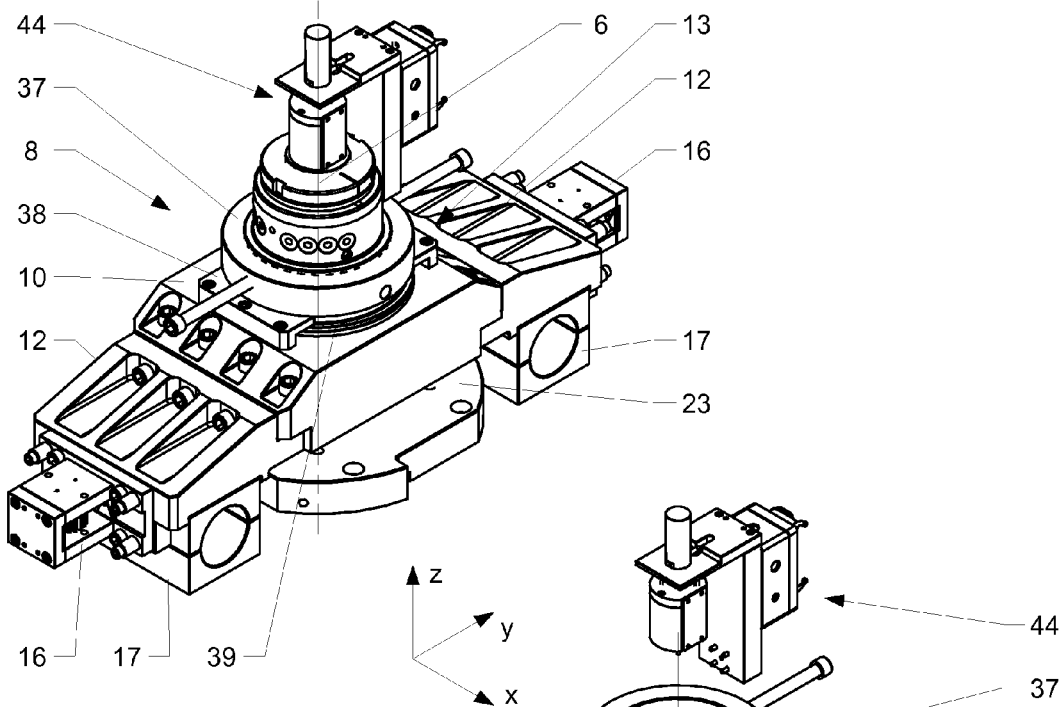

FIG. 1 shows a first embodiment of a mounting device 1 of the invention in a front view (x direction), FIG. 2 shows the mounting device 1 in a side view (y direction) and FIG. 3 shows the mounting device 1 in a perspective view from above at a slant.

The mounting device 1 in the embodiment shown is composed of a lower and an upper mounting device 2, 3. Between the lower and the upper mounting device 2, 3 is arranged a rotatable center part 4. The center part 4 has several parallel lateral surfaces 5 and is mounted rotatably about an axis of rotation 6 (z axis) by means of the lower and the upper mounting device 2, 3. In actuality, first cavity halves (not shown) are arranged in the region of two or four lateral surfaces 5 lying opposite each other in pairs, which first cavity halves cooperate with other cavity halves in the region of a lateral surface of at least one mold half (not shown) and/or another rotatable center part (not shown) to form cavities (not shown) in a closed position of the injection molding device. The lower and the upper mounting device 2, 3 in principle have a similar construction, which will be explained more closely hereafter. The upper mounting device 3 can also be omitted, depending on the area of application.

Figure 7:
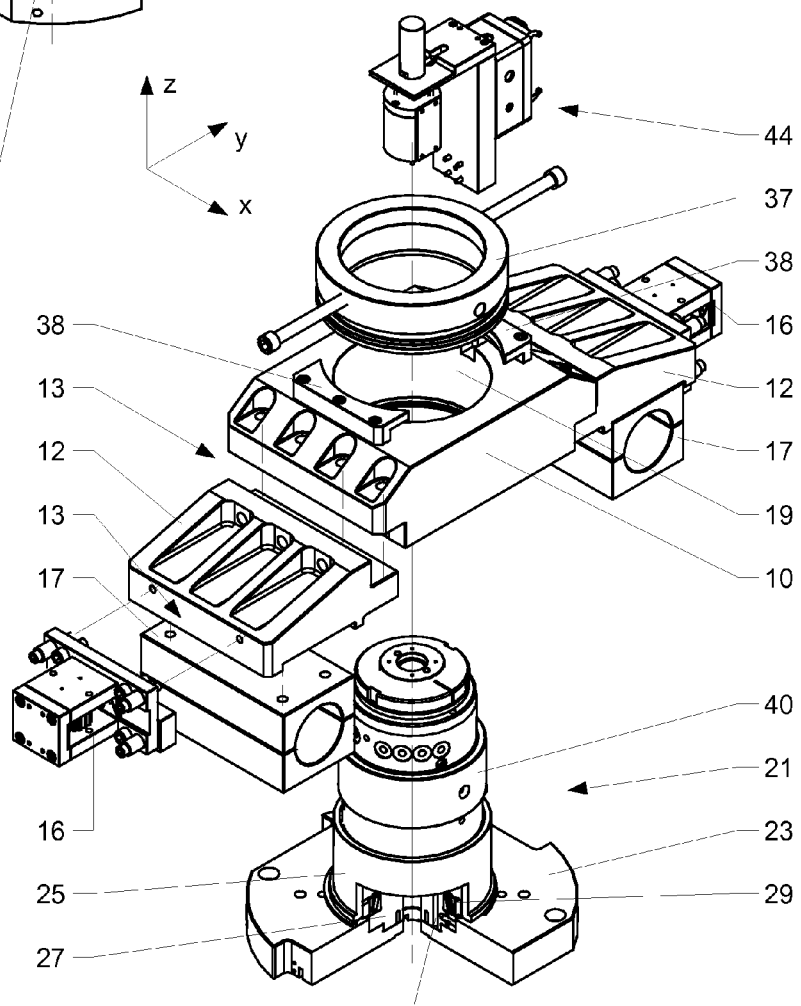

In FIG. 4, the lower mounting device 2 is shown in a perspective view from above at a slant. In FIG. 5, the same lower mounting device 2 is shown in an exploded view, partly disassembled. In FIG. 6, the upper mounting device 3 is shown in a perspective view from above at a slant. In FIG. 7, the same upper mounting device 3 is shown in an exploded view, partly disassembled.

Modularly constructed lower and upper cross members 7, 8 serve as a central supporting element. These cross members 7, 8 each consist of a center block 9, 10 on which opposite facing side blocks 11, 12 are secured at each side via standardized interfaces 13. The standardized interfaces 13 are suitable for the fastening of differently configured side and center blocks 9, 10, 11, 12. That is, differently configured center and side blocks 9, 10, 11, 12 have the same standardized interfaces 13, so that they are compatible with each other. The standardized interfaces can be, e.g., screw connections with a definite hole pattern for example for screws and/or guide pins, and their mating parts.

The center blocks 11, 12 can be configured so that different side blocks 11, 12 can be fastened individually to them, singly or in combination. The side blocks 11, 12, in turn, are configured so that different guide means 14, 15 and/or coordination means 16, 17 can be fastened to standardized interfaces 13 specifically to the application. In this way, the option exists of putting together different configurations which can be easily adapted to different types of injection molding machines.

The center blocks 9, 10 of the lower and the upper mounting device 2, 3 each have a continuous opening 18, 19 in the vertical direction (z direction), serving to receive a lower or an upper rotary unit 20, 21, respectively.

The rotary units 20, 21 in the embodiment shown each have an adapter plate 22, 23, which serve for the one-sided or two-sided mounting of the rotatable center part 4 and for exchange of media such as air, water, oil or energy in mechanical and/or electrical form. Likewise, the adapter plates 22, 23 can have connectors (not shown more closely) which serve for the exchange of information between the center part 4 and at least one adapter plate 22, 23. The adapter plates 22, 23 generally have mechanical operative connection means which serve for the detachable or permanent operative connection of the center part 4. In mounting devices 1 for relatively large injection molding devices (see FIGS. 1 to 7), the operative connection means are generally detachable, so that the center part 4 can be easily installed and removed. In certain embodiments, the adapter plates 22, 23 can be omitted or permanently connected to the rotatable center part 4 in that the rotary units 20, 21 are operatively connected by integration with the rotatable center part 4.

The rotary units 20, 21 both have a nonrotatable outer part 24, 25. Inner parts 26, 27 are mounted able to rotate about the axis of rotation 6 (z axis) relative to the respective outer part 24, 25 by means of bearings 28, 29 (see FIGS. 5 and 7). The bearings 28, 29 are generally ball or roller bearings. Additional bearings can be arranged inside the rotary units 20, 21, but these cannot be seen in the view shown.

FIGS. 5 and 6 show in the region of the adapter plates 22, 23 a portion of the adapter plates 22, 23, of the outer and the inner part 24, 25, as well as one of the bearings 28, 29, in sectional view, so that the inner construction of the rotary units 20, 21 can be better seen. The adapter plates 22, 23 in the embodiment shown are each fastened to one of the inner parts 24, 25. The inner parts 24, 25 have axially extending channels 30, 31, which lead to annular grooves (not visible) extending concentrically in the axial direction inside the respective rotary unit, said annular grooves being arranged between the inner part 26, 27 and the outer part 24, 25. The annular grooves are sealed off from each other by O-rings. The annular grooves, depending on the configuration of the rotary unit 20, 21, can be staggered in the axial direction and/or situated at the same height. The annular grooves are recessed into the inner part 26, 27 and/or the outer part 24, 25.

The lower rotary unit, as shown in FIG. 4, is permanently connected to the lower center block 9 during operation. Beneath the lower adapter plate 22 is placed a first gear 32, operatively connected to the adapter plate 22, which serves for driving of the center part 4 about the axis of rotation 6. The first gear 32 in the embodiment shown meshes with a second, smaller gear 33, which is operatively connected by a transmission 34 to a motor 35. The transmission 34 and the motor 35 are likewise fastened to mounting means of the lower center block 9 that are provided for this purpose. If need be, alternatively or in addition, the upper mounting device 3 can also be outfitted with a drive unit. The transmission 34, which transmits the force from the motor 35 to the coordinated inner part 26 or, if present, to the coordinated adapter plate 22 and from here to the rotatable center part 4, can be a conventional single or multiple-stage transmission. In order to better distribute the forces, a planetary transmission arranged coaxially to the axis of rotation 6 of the center part 4 can also be used.

In this way, one can reduce the wear on the gears, generally turning relative to each other only at an angle of 90° or 180° with regard to the axis of rotation 6.

The upper mounting device 3 is shown in FIGS. 6 and 7. The upper rotary unit 21 is arranged in the opening 19 of the upper center block 10 and can move relative to it in the axial direction (z direction) in a limited range. By means of a adjusting device 36, the axial position of the upper adapter plate 23 can be adjusted relative to the rotatable center part 4, so that it can be easily installed and removed. The adjusting device 36 of the embodiment shown comprises a positioning ring 37, which is positioned free to turn relative to the upper center block 10. Two lugs 38 arranged at the side of the positioning ring 37 are fastened to the upper center block 10 and engage in a circumferential groove 39 of the positioning ring 37. The positioning ring 37 has an inner thread (not seen), which is arranged with an external thread 40 on the outer envelope surface of the upper outer part 25. By turning the positioning ring 37 relative to the upper rotary unit 21, one can move it and, thus, the upper adapter plate 23 in the axial direction relative to the lower adapter plate 22. In this way, the center block can be clamped and released.

As can be seen in FIGS. 1 to 7, guiding and coordination means 14, 15, 16, 17 are fastened to the side blocks 11, 12 of the lower and the upper cross member 7, 8. The upper guide means 15 serve to brace and to guide the mounting device 1, or the rotatable center part 4, with respect to upper, cylindrical tie bars 41 of a conventional injection molding machine (not otherwise shown). The upper guide means 15 embrace the tie bars 41 in the form of two half-shells and can move along the tie bars (in the y direction). Lower guide means 14 are fastened to the side blocks 11 of the lower cross member 7, which are supported on profile rails 42 and can move along them (in the y direction). The profile rails 42 are normally fastened to a foundation of the injection molding machine. If need be, the lower side blocks 11 can be configured so that additional guide means can be fastened to them alternatively or additionally, by means of which the lower cross member 7 can be supported on lower tie bars (not otherwise shown) of an injection molding machine. Electrical energy and/or data is/are transmitted by slip contacts 44 to the rotatable center part 4.

Figure 11:
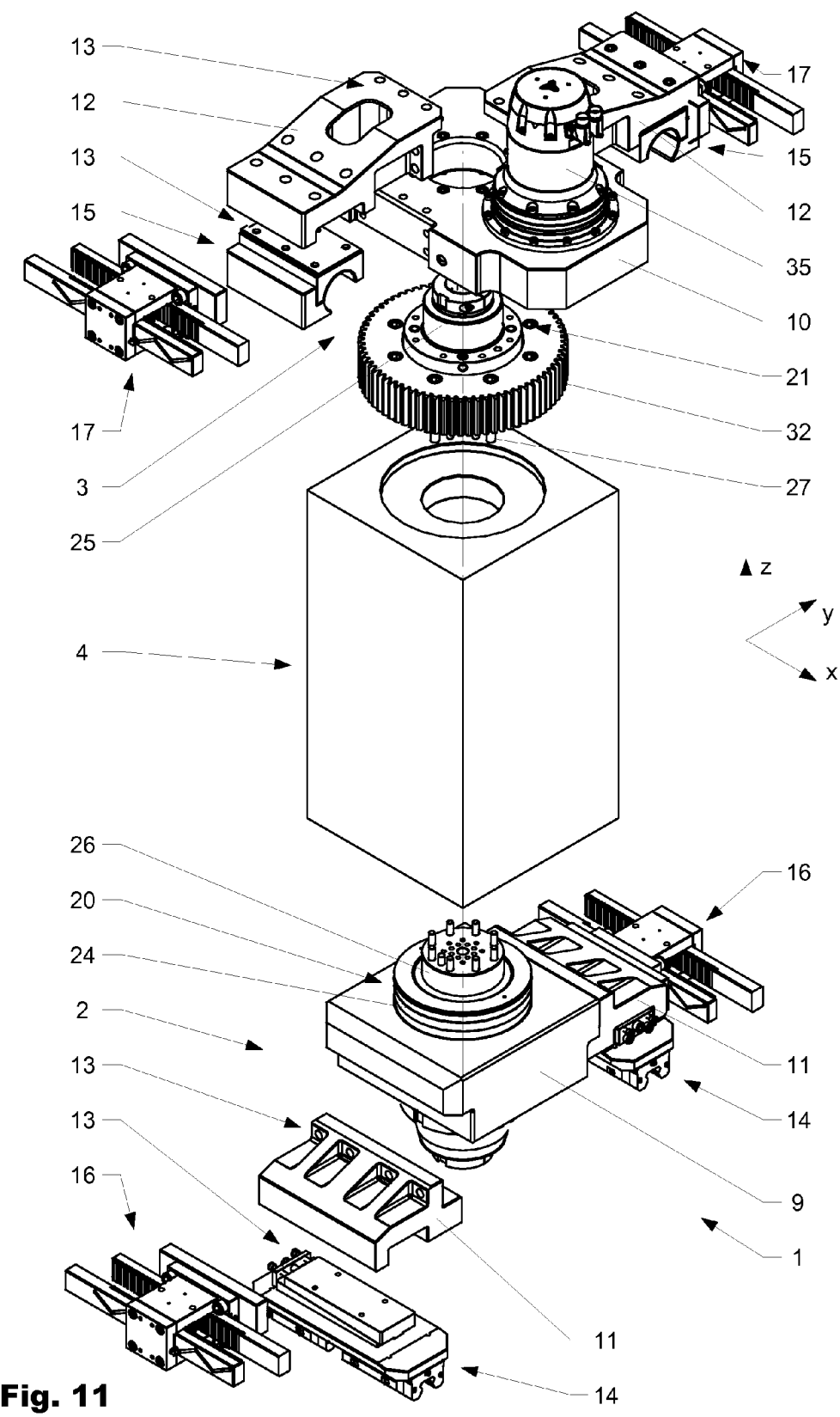

FIGS. 8 to 11 show another embodiment of the mounting device 1. In FIG. 8, the mounting device 1 is shown from the front and in FIG. 9 it is shown from the side. FIG. 10 shows the mounting device 1 in a perspective view from above at a slant. FIG. 11 shows the mounting device 1 in an exploded view from the same viewing direction as FIG. 10. The general description of the embodiment according to FIGS. 1 to 6 also applies to the second embodiment as per FIGS. 8 to 11. Unless otherwise defined, corresponding parts have the same reference symbols.

The mounting device 1 is likewise composed from a lower and an upper mounting device 2, 3. These have modularly constructed cross members 7, 8 as central, supporting elements. Thanks to this construction, the devices made from a few standardized elements can be adapted to different injection molding machines. The cross members 7, 8 each have a center block 9, 10, to which side blocks 11, 12 are fastened on both sides. The side blocks 11, 12 serve for the fastening of guide and/or coordination means 14, 15, 16, 17. The lower and the upper guide means 14, 15 serve for supporting and guiding of the mounting device 1 and the rotating center part 4 in the upper region with respect to the tie bars 41 of an injection molding machine, or in the lower region by guide rails 42 with respect to a foundation of an injection molding machine (not otherwise shown). The mounting device 1 is not supported on the tie bars 41 in the lower region.

In the exploded view of FIG. 11, one sees the construction of the embodiment. The device is disassembled in the x and z direction. The mounting device 1 has a lower and an upper cross member 7, 8, which are configured from multiple pieces. The cross members 7, 8 each have a center block 9, 10, on which side blocks 11, 12 are fastened by standardized interfaces 13 on two opposite sides. On the upper center block 10, a motor 35 is fastened, which drives a rotatable center part 4 and the axis of rotation 6 across a first and a second gear 32, 33 (also see FIGS. 8 and 9). The lower and the upper center block 9, 10 are suitable for accommodating a lower and an upper rotary unit 20, 21. In the embodiment shown, the inner parts 26, 27 of the rotary units 20, 21 are configured so that they are directly and, in normal operation, undetachably operatively connected to the rotatable center part 4. Unlike the embodiment as per FIGS. 1 to 7, in the embodiment shown the upper mounting device 3 cannot move axially (z direction).

Figure 12:
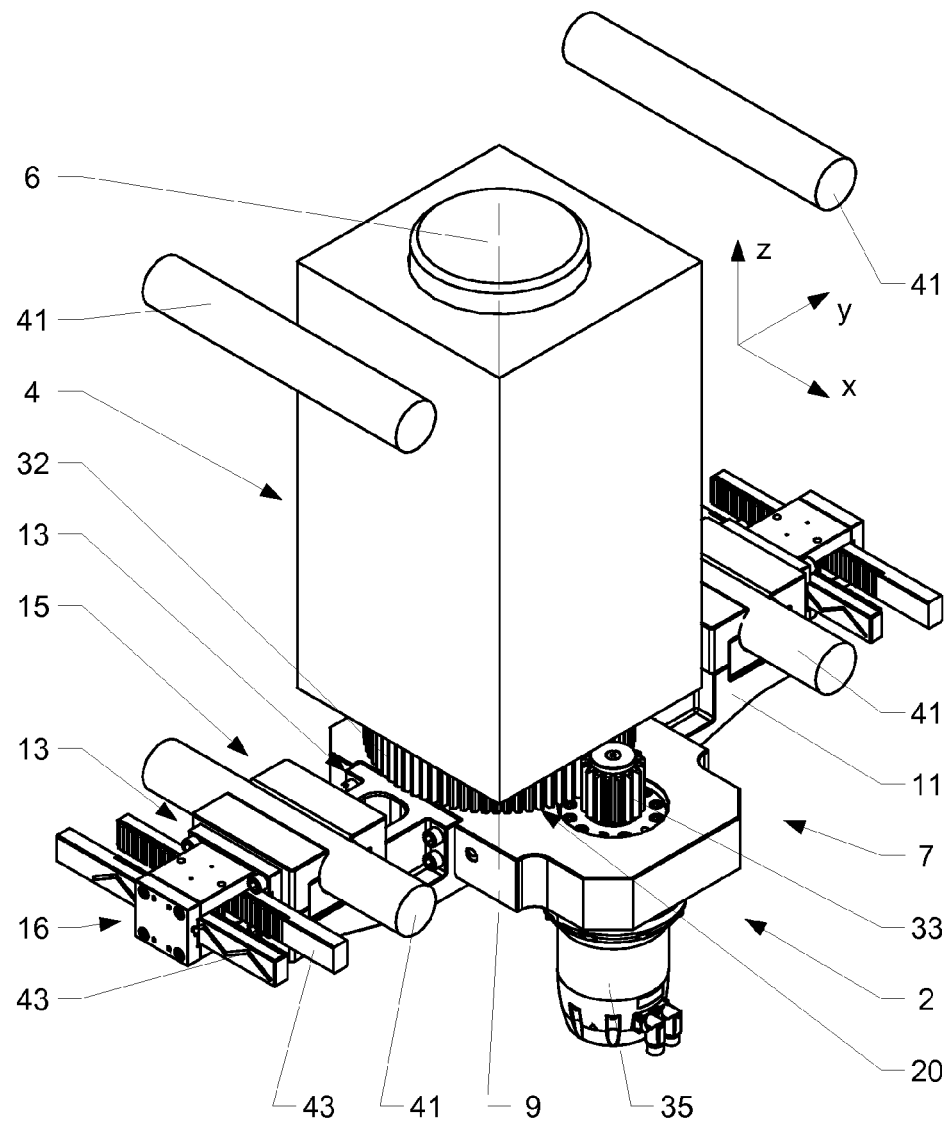

FIG. 12 shows a third embodiment of a mounting device 1 for a rotatable center part 4. The mounting device 1 consists of a lower mounting device 2 with a modularly constructed cross member 7, which has a center block 9 and two side blocks 11 fastened to it at the side by standardized interfaces 13. Guide means 14 are fastened to the side blocks 11, which are operatively connected to tie bars 41 of an injection molding machine (not otherwise shown). The mounting device 1 is movably mounted along the tie bars 41 (x direction). If need be, or alternatively, the cross member 7 can also be supported on a foundation of the injection molding machine by linear guides. Coordination means 16 are likewise fastened to the side blocks 11, which in the embodiment shown are based on racks 43 operatively connected to each other. If need be, other coordination means 16 can be provided. A motor 35 is fastened to the lower center block 9, which serves to drive the center part 4 about the axis of rotation 6 by a transmission consisting of a first and a second gear 32, 33. A lower rotary unit 20 is installed in the center block 9 underneath the first gear 32. The rotary unit can have channels for carrying media. In the upper region, the rotatable center part 4 has no guide and stands free between the tie bars. This configuration is suitable primarily for smaller devices or slowly turning large devices.

The invention claimed is:

1. A mounting device (1) for a center part (4), said center part turnable about an axis of rotation (6) in an injection molding device, said mounting device comprising:
a lower mounting device (2) with a modularly constructed lower cross member (7), including a lower center block (9) and at least one lower side block (11) fastened on the lower center block (9), wherein the lower center block (9) includes operative connection means for the fastening of a lower rotary unit (20) for the rotatable mounting of the center part (4) about the axis of rotation (6).

2. The mounting device of claim 1, wherein the mounting device (1) includes an upper mounting device (3) comprising a modularly constructed upper cross member (8), including a center block (10) and at least one upper side block (12) fastened on the upper center block (10), wherein the center block (10) includes operative connection means for the fastening of an upper rotary unit (21) for the rotatable mounting of the center part (4) about the axis of rotation (6).

3. The mounting device (1) as claimed in claim 1, wherein at least one side block (11, 12) includes operative connection means for the fastening of a guide means (14, 15), by which the cross member (7, 8) is guided with respect to the injection molding device.

4. The mounting device (1) of claim 1, wherein at least one side block (11, 12) includes operative connection means for the fastening of a coordination means (16, 17), by which the cross member (7, 8) is coordinated with respect to the injection molding device.

5. The mounting device (1) of claim 4, wherein the coordination means (16, 17) are racks or hydraulic cylinders.

6. The mounting device (1) of claim 1, wherein the rotary unit (20, 21) includes an inner part (26, 27) rotatably mounted relative to an outer part (24, 25), and between the outer part (24, 25) and the inner part (26, 27) there are arranged concentrically running annular grooves for the transfer of media between the outer part (24, 25) and the inner part (26, 27).

7. The mounting device (1) of claim 6, wherein the annular grooves are staggered from each other in the axial direction (z).

8. The mounting device (1) of claim 6, wherein the annular grooves are staggered from each other in the radial direction.

9. The mounting device (1) of claim 6 wherein the inner part (26, 27) includes an adapter plate (22, 23) for operative connection to the rotatable center part (4).

10. The mounting device (1) of claim 6, wherein the inner part (26, 27) is operatively connected permanently to the rotatable center part (4).

11. The mounting device (1) of claim 6, wherein the inner part (26, 27) includes axially extending channels (30, 31) for transfer of media to the rotating center part.

12. The mounting device (1) of claim 6, wherein the adapter plate (22, 23) includes quick couplings for transfer of media between the adapter plate (22, 23) and the rotatable center part (4).

13. The mounting device (1) of claim 1, wherein at least one mounting device (2, 3) includes a motor (35), which is operatively connected via a transmission (32, 33) to the rotating center part (4) and serves to drive it.

14. The mounting device (1) of claim 13, wherein the transmission (32, 33) is a planetary transmission.

15. The mounting device (1) of claim 1, wherein the mounting device (1) includes an adjusting device (36), by which an adapter plate (22, 23) is positionable in the axial direction relative to the center block (4).

16. The mounting device (1) of claim 1, wherein the center block (4) includes a continuous opening (18, 19) extending in the axial direction (z), which serves to receive a rotary unit (20, 21).

17. An injection molding device with a first and a second mold half and at least one mounting device (1) arranged between them for the mounting of a rotatable center part (4) as claimed in claim 1.

18. The injection molding device of claim 17, wherein the mounting device (1) is connected permanently to the injection molding device.

* * * * *